(12) United States Patent
Schmatloch et al.

(10) Patent No.: US 10,400,144 B2
(45) Date of Patent: Sep. 3, 2019

(54) LATENT TWO-PART POLYURETHANE ADHESIVES

(71) Applicant: DOW GLOBAL TECHNOLOGIES LLC, Midland, MI (US)

(72) Inventors: Stefan Schmatloch, Horgen (CH); Ilona Caderas, Horgen (CH)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 155 days.

(21) Appl. No.: 15/579,744

(22) PCT Filed: Jun. 14, 2016

(86) PCT No.: PCT/US2016/037449
§ 371 (c)(1),
(2) Date: Dec. 5, 2017

(87) PCT Pub. No.: WO2016/205254
PCT Pub. Date: Dec. 22, 2016

(65) Prior Publication Data
US 2018/0179426 A1 Jun. 28, 2018

Related U.S. Application Data

(60) Provisional application No. 62/316,677, filed on Apr. 1, 2016, provisional application No. 62/316,680, filed on Apr. 1, 2016, provisional application No. 62/213,650, filed on Sep. 3, 2015, provisional application No. 62/181,359, filed on Jun. 18, 2015.

(51) Int. Cl.
| | |
|---|---|
| C09J 175/08 | (2006.01) |
| C08G 18/48 | (2006.01) |
| C08G 18/50 | (2006.01) |
| C08G 18/76 | (2006.01) |
| C08G 18/73 | (2006.01) |
| C08G 18/24 | (2006.01) |
| C08G 18/16 | (2006.01) |
| C08G 18/20 | (2006.01) |
| B32B 37/12 | (2006.01) |
| C09J 5/04 | (2006.01) |
| C08G 65/32 | (2006.01) |
| C09J 175/04 | (2006.01) |
| C09J 5/06 | (2006.01) |
| C09J 11/04 | (2006.01) |
| C08G 18/66 | (2006.01) |
| C08J 3/24 | (2006.01) |
| C08J 3/28 | (2006.01) |
| C08G 18/79 | (2006.01) |
| C08K 3/04 | (2006.01) |
| C08K 3/34 | (2006.01) |
| C08K 3/36 | (2006.01) |
| C08K 9/00 | (2006.01) |
| B32B 7/12 | (2006.01) |

(52) U.S. Cl.
CPC ............ *C09J 175/08* (2013.01); *B32B 37/12* (2013.01); *C08G 18/165* (2013.01); *C08G 18/2063* (2013.01); *C08G 18/242* (2013.01); *C08G 18/244* (2013.01); *C08G 18/482* (2013.01); *C08G 18/4812* (2013.01); *C08G 18/4837* (2013.01); *C08G 18/5024* (2013.01); *C08G 18/6674* (2013.01); *C08G 18/798* (2013.01); *C08J 3/24* (2013.01); *C08J 3/244* (2013.01); *C08J 3/28* (2013.01); *C09J 5/06* (2013.01); *C09J 11/04* (2013.01); *C09J 175/04* (2013.01); *B32B 7/12* (2013.01); *B32B 2037/1253* (2013.01); *C08J 2375/04* (2013.01); *C08K 3/04* (2013.01); *C08K 3/346* (2013.01); *C08K 3/36* (2013.01); *C08K 9/00* (2013.01); *C09J 2205/31* (2013.01); *C09J 2400/226* (2013.01); *C09J 2475/00* (2013.01)

(58) Field of Classification Search
CPC ............ C08G 18/485; C08G 18/4833; C08G 18/5024; C08G 18/7671; C08G 18/7664; C08G 18/82; C08G 18/242; C08G 18/165; C08G 18/2063; C08G 18/73; C09J 175/08; B32B 3737/12
See application file for complete search history.

(56) References Cited

U.S. PATENT DOCUMENTS

| | | | |
|---|---|---|---|
| 4,742,113 A | 5/1988 | Gismondi et al. | |
| 4,876,308 A | 10/1989 | Melby et al. | |

(Continued)

FOREIGN PATENT DOCUMENTS

| | | |
|---|---|---|
| EP | 1435366 A1 | 7/2004 |
| WO | 2009/015149 A1 | 1/2009 |

(Continued)

OTHER PUBLICATIONS

ISONATE 143L data sheet, published Aug. 2001. (Year: 2001).*

(Continued)

*Primary Examiner* — Christopher M Rodd
(74) *Attorney, Agent, or Firm* — The Dobrusin Law Firm, P.C.

(57) ABSTRACT

Two-component polyurethane adhesives include a polyol component and a polyisocyanate component. The polyol component includes a polyether polyol and specific amount of an aliphatic diol chain extender. The polyisocyanate component includes an isocyanate prepolymer made by reacting an aromatic polyisocyanate with a polyether. The adhesive has an excellent combination of a prolonged open time followed by curing to form a strong adhesive bond. The adhesive is especially useful for bonding carbon fiber-reinforced plastics.

19 Claims, No Drawings

(56) References Cited

U.S. PATENT DOCUMENTS

| | | | |
|---|---|---|---|
| 5,143,996 A | | 9/1992 | Chung et al. |
| 5,606,003 A | | 2/1997 | Wang et al. |
| 6,926,949 B1 | | 8/2005 | Haelg et al. |
| 7,129,312 B1 | * | 10/2006 | Krebs .................... C08G 18/10 528/59 |
| 2008/0306176 A1 | * | 12/2008 | Nefzger ................ C08G 18/10 521/157 |
| 2009/0044907 A1 | * | 2/2009 | Tribelhorn ......... C08G 18/0895 156/307.4 |
| 2012/0028561 A1 | | 2/2012 | Takado |
| 2013/0255880 A1 | | 10/2013 | Mahdi et al. |
| 2015/0159064 A1 | | 6/2015 | Roock et al. |
| 2015/0203728 A1 | | 7/2015 | Burckhardt et al. |
| 2015/0247073 A1 | | 9/2015 | Kelch |

FOREIGN PATENT DOCUMENTS

| | | |
|---|---|---|
| WO | 2012/078331 A1 | 6/2012 |
| WO | 2012/158664 A2 | 11/2012 |
| WO | 2014/029787 A1 | 2/2014 |
| WO | 2014/029891 A1 | 2/2014 |
| WO | 2014/040909 A1 | 3/2014 |
| WO | 2014/040916 A1 | 3/2014 |

OTHER PUBLICATIONS

PAPI 27 data sheet, published Mar. 2001. (Year: 2001).*
International Search Report for Application No. PCT/US2016/037449 dated Oct. 24, 2016.

* cited by examiner

LATENT TWO-PART POLYURETHANE ADHESIVES

FIELD

This invention relates to latent two-part polyurethane adhesives.

BACKGROUND

Adhesives are replacing many types of mechanical fasteners in vehicle production. This is driven at least in part by a desire to minimize vehicle weight. Reducing vehicle weight can provide several benefits, such as faster acceleration and braking and greater fuel economy. Adhesives are often less massive than the mechanical fasteners they replace. Additionally, metal parts are being more and more replaced with lighter weight plastic and composite parts. It is often the case that the mechanical fastening systems used to fasten metals are inappropriate for fastening plastics and composites. In at least some those cases, manufacturers are looking to adhesives to solve the joining problem.

For example, plastics and plastic composites are now being used as vehicle body panels. One type that is gaining in prominence is a carbon fiber-reinforced polymer. Using adhesives to supplement or replace mechanical fasteners provides operational advantages because manufacturing processes can be simplified. Gluing can also provide significant aesthetic advantages in some cases.

Polyurethanes are a well-known type of adhesive. They are made from precursors that cure in place to form an adhesive layer. As the adhesive cures, it forms a strong adhesive bond to many types of substrates. However, carbon fiber-reinforced polymers (CFRPs) are an exception to the general rule. To achieve good adhesion to a CFRP, it has been necessary to first apply an adhesion promoter to the substrate surface. In addition, it usually has been necessary to roughen the CFRP surface before applying the adhesion (and adhesion promoter) to obtain adequate adhesion.

Latency is another desirable attribute of many vehicular adhesive systems. A rapidly-curing adhesive does not allow much time for the adhesive to be applied and the substrates to be positioned correctly. Therefore, the adhesive preferably is formulated so it remains flowable for a reasonable period after it is applied. The period during which the adhesive remains flowable is referred to as "open time".

Polyurethane adhesives systems are almost always catalyzed. The selection of particular catalysts (and their amounts) can have a large effect on the open time. For example, a long open time can be achieved by using very small amounts of catalyst, or none at all. But this approach leads to very long cure times and/or the need to use very high curing temperatures, neither of which may be practical in an industrial setting and which in the latter case might damage the substrate. Low catalyst loading to achieve latency also tends to result in poor adhesion performance.

Another approach to latency is through the use of heat-activated catalysts. These are often chemically blocked or encapsulated so the active catalytic species does not become available until some elevated temperature is reached, at which point the curing reaction usually takes place rapidly. A problem with this approach is that heat must be applied, which is not always practical or desirable at the point of application, and may in some cases even damage the substrate. The exothermic heat of reaction in these cases can further increase the temperature and lead to damage to the substrate.

Another problem with the latent catalyst approach is that in some cases at least some ambient temperature curing is desirable. For example, an adhesive can simply run off the substrate if its viscosity is very low. Furthermore, even a semi-solid or pasty adhesive ideally should not sag when it is applied. On the other hand, low viscosities are favored from the standpoint of easy application. To get around the somewhat contradictory desires for easy application and minimal run-off and sagging, some initial curing is often wanted to thicken the adhesive. In a factory setting, his initial curing often needs to be performed at ambient temperatures which are typically below 40° C. and more typically below 30° C.

Some polyurethane adhesives are formulated with carbon black, which in certain quantities greatly reduces sagging. However, carbon black is expensive, imparts a black color to the adhesive, which may be undesirable in some applications, and usually requires the adhesive to be formulated with one or more plasticizers to render it sufficiently flowable to permit it to be applied easily. Carbon black and plasticizers also have an adverse impact on adhesion performance.

What is desired is a polyurethane adhesive that adheres well to various plastics and composites, and has an open time of at least 12 minutes at room temperature. The adhesive preferably adheres strongly to CFRP, even without the need to first apply an adhesion promoter or to grind the CFRP surface. The adhesive preferably at least partially cures at a temperature below 40° C. to thicken it so it resists run-off and sag, and preferably is capable of full cure without heating.

SUMMARY

This invention is in one aspect a two-component polyurethane adhesive composition having a polyol component and an isocyanate component, wherein:

the polyol component includes:
a) at least 35 weight percent, based on the weight of the polyol component, of one or more polyether polyols having a hydroxyl equivalent weight of 400 to 2000 and a nominal hydroxyl functionality of 2 to 4, which polyether polyols(s) are selected from homopolymers of propylene oxide and copolymers of 70 to 99% by weight propylene oxide and 1 to 30% by weight ethylene oxide;
b) 4 to 8 equivalents per equivalent of a) of one or more aliphatic diol chain extenders;
c) 0.1 to 3 parts by weight per 100 parts by weight of a) of at least one compound having at least two primary and/or secondary aliphatic amine groups;
d) a catalytically effective amount of at least one urethane catalyst;
e) up to 60 weight percent, based on the weight of the polyol component, of at least one particulate filler;
and the polyisocyanate component includes:
25 to 60 weight percent, based on the weight of the polyisocyanate component, of at least one isocyanate-terminated prepolymer having at least 2 isocyanate groups per molecule and an isocyanate equivalent weight of 500 to 3500, the prepolymer being the reaction product of one or more aromatic diisocyanates having a molecular weight of up to 350 with i) at least one 700 to 3000 molecular weight homopolymer of poly(propylene oxide) having a nominal hydroxyl functionality of 2 to 4 or ii) a mixture of i) with up to 3 parts by weight, per part by weight of i), of a 2000 to 8000 molecular weight polyether polyol which is a copolymer of 70 to 99 weight percent propylene oxide and 1 to 30 weight percent ethylene oxide and has a nominal hydroxyl functionality of 2 to 4;

20 to 50 weight percent, based on the weight of the polyisocyanate component, of at least one polyisocyanate compound having an isocyanate equivalent weight of up to 300 and 2 to 4 isocyanate groups per molecule; and up to 50% by weight of at least one particulate filler;

wherein the isocyanate equivalent weight of the polyisocyanate component and the equivalent weight per isocyanate-reactive group of the polyol component are such that when the polyisocyanate component and the polyol component are mixed at a 1:1 ratio by volume the isocyanate index is 1.1 to 1.8.

The invention is also a cured adhesive formed by curing the two-component polyurethane adhesive composition of the invention. The invention is also a method of bonding two substrates, comprising forming a layer of the two-component polyurethane adhesive at a bondline between two substrates, and curing the layer at the bondline to form a cured adhesive bonded to each of the substrates.

The adhesive composition adheres strongly to many substrates. In particular, it exhibits excellent adhesion to plastics and to composites such as CFRP, even when applied without the prior application of an adhesion promoter and when applied to a CFRP substrate that has not been surface-roughened.

Surprisingly, the adhesive composition exhibits good latency, even when formulated with an ambient temperature urethane catalyst. This is a significant advantage, as it permits the adhesive composition to be formulated for an ambient temperature cure if desired. Despite its latency, the adhesive cures well at room temperature when formulated with an ambient temperature catalyst, without the need for applied heating (apart from an exothermic temperature rise due to the curing reaction itself). If desired, the adhesive composition can be formulated for an elevated temperature cure by including one or more heat-activated catalysts in the formulation.

Despite its latency, the adhesive composition has good sag resistance, even when formulated without carbon black. Plasticizers are generally unnecessary to obtain good results.

DETAILED DESCRIPTION

Ingredient a) of the polyol component is a polyether polyol or mixture of polyether polyols. Each such polyether polyol has a hydroxyl equivalent weight of 400 to 2000. The hydroxyl equivalent weight of each polyol in some embodiments is at least 500, at least 800 or at least 1000, and in some embodiments is up to 1800, up to 1500 or up to 1200.

Each such polyether polyol has a nominal hydroxyl functionality of 2 to 4. By "nominal functionality" of a polyether polyol, it is meant the average number of oxyalkylatable hydrogen atoms on the initiator compound that is alkoxylated to form the polyether polyol. The actual functionalities of the polyether polyol(s) may be somewhat lower than the nominal functionality, due to side-reactions that occur during the alkoxylation process. In the case of a mixture of polyether polyols, the number average nominal functionality preferably is 2 to 3.5 and especially 2.5 to 3.5.

The polyether polyol(s) are selected from homopolymers of propylene oxide and copolymers of 70 to 99% by weight propylene oxide and 1 to 30% by weight ethylene oxide. Such a copolymer of propylene oxide and ethylene oxide is generally preferred if a single polyether polyol is present. If two or more polyether polyols are present, it is preferred that at least one is such a copolymer of propylene oxide and ethylene oxide. In the case of a copolymer, the propylene oxide and ethylene oxide may be randomly copolymerized, block copolymerized, or both.

In some embodiments, 50% or more of the hydroxyl groups of the polyether polyol or mixture of polyether polyols are primary hydroxyl (with the remainder being secondary hydroxyl groups). 70% or more of the hydroxyl groups in the polyether polyol or mixture thereof may be primary hydroxyl.

The polyether polyol(s) (ingredient a)) constitute at least 35 weight percent of the polyol component. In some embodiments, the polyether polyols(s) constitute at least 40 weight percent or at least 50 weight percent of the polyol component, and in some embodiments constitute up to 80 weight percent, up to 65 weight percent or up to 55 weight percent thereof.

Ingredient b) of the polyols component is one or more aliphatic diol chain extenders. The aliphatic diol chain extender(s) each have a hydroxyl equivalent weight of up to 200, preferably up to 100, more preferably up to 75 and still more preferably up to 60, and exactly two aliphatic hydroxyl groups per molecule. Examples of these are monoethylene glycol, diethylene glycol, triethylene glycol, 1,2-propane diol, 1,3-propane diol, 2,3-dimethyl-1,3-propanediol, dipropylene glycol, tripropylene glycol, 1,4-butanediol, 1,6-hexanediol and other linear or branched alkylene diols having up to about 20 carbon atoms. The aliphatic diol chain extender preferably includes monoethylene glycol, 1,4-butanediol or a mixture thereof. A most preferred aliphatic diol chain extender is monoethylene glycol or a mixture thereof with 1,2-propane diol and/or 1,4-butanediol. Compared to 1,4-butandiol, the selection of monoethylene glycol as the main or sole aliphatic diol chain extender has been found to provide good latency together with rapid bond strength development, especially at an ambient temperature cure.

The aliphatic diol chain extender or mixture thereof is present in an amount of 4 to 8 equivalents per equivalent of ingredient a) of the polyol component. A preferred amount is 4 to 7 or 4 to 6 equivalents per equivalent of ingredient a). In certain embodiments, ingredient b) includes monoethylene glycol, or a mixture of monoethylene glycol with one or both of 1,2-propane diol and 1,4-butanediol, in an amount sufficient to provide at least 4 equivalents of monoethylene glycol per equivalent of polyol a).

Ingredient c) of the polyol component is at least one compound having two or more primary and/or secondary aliphatic amine groups. Such compounds preferably have a molecular weight of at least 60, more preferably at least 100, up to 1000, more preferably up to about 750 and still more preferably up to 500. Such compounds may have 2 to 4, more preferably 2 to 3, primary and/or second aliphatic amine groups and 2 to 8, more preferably 3 to 6 hydrogens bonded to aliphatic nitrogen atoms. Examples of the ingredient c) materials include ethylene diamine; 1,3-propanediamine; 1,2-propane diamine; polyalkylene polyamines such as diethylene triamine and triethylene tetraamine; isophorone diamine; cyclohexane diamine; bis(aminomethyl) cyclohexane and aminated polyethers such as those sold as Jeffamine™ D-400 and T-403 by Huntsman Corporation. The ingredient c) material provides a rapid initial thickening when the polyol and polyisocyanate components are first mixed, but is present in only a small amount so open time remains long enough that the adhesive can be mixed and applied in an industrial setting. The ingredient c) material therefore is present in an amount of 0.1 to 3 parts by weight per 100 parts by weight of ingredient a), and in some embodiments 0.25 to 2 parts by weight or 0.5 to 1.5 parts by weight on the same basis.

The polyol component further contains ingredient d), a catalytically effective amount of at least one urethane catalyst. A "urethane catalyst" for purposes of this invention, is a material that catalyzes the reaction of a hydroxyl group with an isocyanate group. Suitable catalysts include, for example, tertiary amines, cyclic amidines, tertiary phosphines, various metal chelates, acid metal salts, strong bases, various metal alcoholates and phenolates and metal salts of organic acids.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Other useful tin catalysts include dialkyl tin mercaptides such as dioctyltinmercaptide, dibutyltinmercaptide and dibutyltin mercaptide.

Examples of other metal-containing catalysts are bismuth, cobalt and zinc salts.

Examples of tertiary amine catalysts include: trimethylamine, triethylamine, N-methylmorpholine, N-ethylmorpholine, N, N-dimethylbenzylamine, N,N-dimethyl-ethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Useful amidine catalysts include 1,8-diazabicyclo[5.4.0]-undec-7-ene or 1,5-Diaza-bicyclo[4.3.0]non-5-ene (DBN) and the like.

In some embodiments, ingredient d) of the polyol component includes at least one ambient temperature urethane catalyst. An ambient temperature catalyst, for purposes of this invention, is a catalyst that is active at a temperature of below 30° C., preferably at 22° C., and thus does not require exposure to an elevated temperature to become catalytically active. Examples of these include the tin, tertiary amine and cyclic amidine catalysts described above. Surprisingly, good latency is seen despite the presence of the ambient temperature urethane catalyst.

In other embodiments, the urethane catalyst includes at least one latent catalyst. For purposes of this invention, a latent catalyst is one which requires exposure to an elevated temperature of at least 40° C. to become catalytically active. Any latent room temperature organometallic catalysts which provides good open time, acceptable initial lap shear strengths and which maintains an acceptable level of reactivity after partial curing and storage may be utilized. Exemplary classes of latent room temperature organometallic catalysts contain tin, zinc or bismuth. Exemplary latent room temperature organometallic catalysts include zinc alkanoates, bismuth alkanoates, dialkyltin alkanoates, dialkyl tin mercaptides, dialkyl tin bis(alkylmercaptoacetates), dialkyltin thioglycol-ates or mixtures thereof. Exemplary latent room temperature organometallic catalysts include zinc neoalkanoates, bismuth neoalkanoates, dialkyltin neoalkanoates, dialkyl tin mercaptides, dialkyl tin bis(alkylmercapto acetates), dialkyltin thioglycolates or mixtures thereof. The latent room temperature organometallic catalysts may be dialkyl tin mercaptides, dialkyl tin bis(alkylmercapto-acetates), dialkyltin thioglycolates or mixtures thereof. The latent room temperature organometallic catalysts may be dialkyltin thiogly-colates or mixtures thereof. The alkyl groups on the latent room temperature organo-metallic catalysts may be any alkyl groups of about 1 or more carbon atoms or 4 or greater carbon atoms. The alkyl groups on the latent room temperature organometallic catalysts may be any alkyl groups of about 20 or less carbon atoms or 12 or less carbon atoms. Exemplary alkyls groups include methyl, butyl, octyl and dodecyl groups. The latent room temperature organometallic catalysts may be present in an amount sufficient to provide good open time, acceptable initial lap shear strengths and which maintains an acceptable level of reactivity after partial curing and storage. Examples of such latent catalysts include, for example, dialkyl tin thioglycolates such as dioctyltinthioglcolate, dibutyltinthioglycolate and dimethyltinthioglycolate; and acid-blocked tertiary amine and/or cyclic amidine catalysts, in which the acid blocking group is, for example, a carboxylic acid such as a C1-C18 alkanoic acid, a benzoate or substituted benzoate and the like. Any of the tertiary amine and/or cyclic amidine catalysts described above can be acid-blocked in this manner to produce a latent catalyst. Specific examples include carboxylic acid-blocked triethylene diamine catalysts such as Niax™ 537 (Momentive Performance Products) and carboxylic acid-blocked 1,8-diazabicyclo[5.4.0]-undec-7-ene catalysts such as Toyocat DB41 (Tosoh Corporation) and Polycat SA-1/10 (Momentive Performance Products).

In still other embodiments, the polyol component includes at least one ambient temperature urethane catalyst and at least one latent catalyst. In specific embodiments, the ambient temperature catalyst includes at least one ambient temperature tertiary amine catalyst such as triethylenediamine and the latent urethane catalyst includes at least one acid-blocked tertiary amine or acid-blocked cyclic amidine catalyst such as an acid-blocked 1,8-diazabicyclo[5.4.0]-undec-7-ene. In other specific embodiments, the ambient temperature catalyst includes at least one ambient temperature tertiary amine catalyst such as triethylenediamine and the latent urethane catalyst includes at least one dialkyltinthioglycolate. In yet other specific embodiments, the ambient temperature catalyst includes at least one ambient temperature tertiary amine catalyst such as triethylenediamine and the latent urethane catalyst includes at least dialkyltinthioglycolate and at least one acid-blocked tertiary amine or acid-blocked cyclic amidine catalyst such as an acid-blocked 1,8-diazabicyclo[5.4.0]-undec-7-ene.

The catalyst(s) are used in catalytically effective amounts, for example, each catalyst being employed from about 0.0015 to about 5% by weight of polyether polyol(s) (ingredient a) of the polyol component). Tin catalysts are generally used in very small amounts, such as from 0.0015 to 0.25 weight-%.

The polyol component may further include one or more optional components.

The polyol component may contain at least one particulate filler; however, if a filler is present, it constitutes no more than 60 weight percent of the total weight of the polyol component. It preferably constitutes 25 to 60, more preferably 30 to 50 weight percent of the polyol component. The particulate filler is in the form of particles having a size of 50 nm to 100 μm. The fillers may have a particle of at least 250 nm, at least 500 nm or at least 1 p.m, up to, for example, 50 μm, 25 μm or 10 μm. Particle sizes are conveniently measured using dynamic light scattering methods, or laser diffraction methods for particles having a size below about 100 nm.

The particulate filler is a solid material at room temperature, is not soluble in the other ingredients of the polyol component or in the polyisocyanate component or any ingredient thereof. The filler is a material that does not melt, volatilize or degrade under the conditions of the curing reaction between the polyol and polyisocyanate components. The filler may be, for example, an inorganic filler such as glass, silica, boron oxide, boron nitride, titanium oxide, titanium nitride, fly ash, calcium carbonate, various alumina-silicates including clays such as wollastonite and kaolin, a metal particles such as iron, titanium, aluminum, copper, brass, bronze and the like; thermoset polymer particles such as polyurethane, cured epoxy resin, phenol-formaldehyde, cresol-formaldehyde, crosslinked polystyrene and the like; thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. In some embodiments, the particulate filler excludes carbon particles. The particles in some embodiments have an aspect ratio of up to 5, preferably up to 2, more preferably up to 1.5.

Some or all of the filler particles can be grafted onto one or more of the polyether polyol(s) that constitute ingredient (a) of the polyol component.

Another optional ingredient is one or more dispersing aids, which wet the surface of the filler particles and help them disperse into the polyether polyol(s). These may also have the effect of reducing viscosity. Among these are, for example, various dispersing agents sold by BYK Chemie under the BYK, DISPERBYK and ANTI-TERRA-U tradenames, and fluorinated surfactants such as FC-4430, FC-4432 and FC-4434 from 3M Corporation. Such dispersing aids may constitute, for example, up to 2 weight percent, preferably up to 1 weight percent of the polyol component.

Another useful optional ingredient of the polyol component is a desiccant such as fumed silica, silica gel, aerogel, various zeolites and molecular sieves, and the like. One or more desiccants may constitute up to 5 weight percent, preferably up to 2 weight percent of the polyol component, and may be absent from the polyol component.

The polyol component may further include one or more additional isocyanate-reactive compounds, different from ingredients a), b) and c) of the polyol component. If any such additional isocyanate-reactive compound(s) are present, they preferably constitute no more than 10 percent, more preferably no more than 5 percent and even more preferably no more than 2 percent, of the weight of the polyol component. Examples of such additional isocyanate-reactive compounds include, for example, one or more polyester polyols; one or more polyether polyols containing at least 50 weight percent polymerized ethylene oxide; one or more polyether polyols having a hydroxyl equivalent weight of 100 to 499; one or more aromatic amine compounds; and one or more crosslinkers having three or more isocyanate-reactive groups per molecular and a hydroxyl equivalent weight of up to 499.

The adhesive of the invention preferably is non-cellular, and for that reason, the polyol component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction.

The polyol component in some embodiments contains no more than 10 weight percent, preferably no more than 5 weight percent, and even more preferably no more than 1 weight percent, of a plasticizer such as a phthalate, terephthalate, mellitate, sebacate, maleate or other ester plasticizer, a sulfonamide plasticizer, a phosphate ester plasticizer, or a polyether di(carboxylate) plasticizer. Such a plasticizer most preferably is absent from the polyol component.

The polyisocyanate component contains at least one isocyanate-terminated prepolymer having at least 2 isocyanate groups per molecule and an isocyanate equivalent weight of 700 to 3500. The prepolymer is a reaction product of one or more aromatic diisocyanates having a molecular weight of up to 350 with i) at least one 700 to 3000 molecular weight homopolymer of poly(propylene oxide) having a nominal hydroxyl functionality of 2 to 4, or ii) a mixture of i) with up to 3 parts by weight, per part by weight of i), of a 2000 to 8000 molecular weight polyether polyol which is a copolymer of 70 to 99 weight percent propylene oxide and 1 to 30 weight percent ethylene oxide and has a nominal hydroxyl functionality of 2 to 4.

The poly(propylene oxide) preferably used to make the prepolymer has a molecular weight of 800 to 2000 and more preferably from 800 to 1500, and preferably has a nominal functional of 2 to 3, especially 2. The copolymer of 70 to 99 weight percent propylene oxide and 1 to 30 weight percent ethylene oxide used to make the prepolymer preferably has a molecular weight of 3000 to 5500 and a nominal functionality of 2 to 3.

The reaction of polyisocyanate and polyol(s) produces prepolymer molecules having a polyether segment that is capped with the polyisocyanate, so the molecules have terminal isocyanate groups. Each prepolymer molecule contains a polyether segment that corresponds to the structure, after removal of hydroxyl groups, of a polyol used in the prepolymer-forming reaction. If a mixture of polyols is used to make the prepolymer, a mixture of prepolymer molecules is formed.

The prepolymer constitutes 20 to 65 percent of the weight of the polyisocyanate component. In some embodiments, it constitutes 20 to 60 percent, 20 to 50 percent or 25 to 35 percent of the weight of the polyisocyanate component.

The isocyanate-terminated prepolymer has an isocyanate equivalent weight of 500 to 3500, more preferably 700 to 3000 and even more preferably 1000 to 3000. The equivalent weight for purposes of this invention is calculated by adding the weight of the polyol(s) used to prepare the prepolymer and the weight of polyisocyanate(s) consumed in reaction with the polyol, and dividing by the number of isocyanate groups in the resulting prepolymer.

The polyisocyanate used to make the prepolymer can be any of the polyisocyanate compounds mentioned below, or a mixture of two or more of these. The prepolymer has at least 2, preferably 2 to 4, especially 2 to 3, isocyanate groups per molecule. The isocyanate groups of the prepolymer may be aromatic, aliphatic (including alicyclic), or a mixture of aromatic and aliphatic isocyanate groups. The isocyanate groups on the prepolymer molecules preferably are aromatic.

The isocyanate component further contains 20 to 50 weight percent, based on the weight of the polyisocyanate component, of one or more polyisocyanate compound(s) having an isocyanate equivalent weight of up to 350 and 2 to 4 isocyanate groups per molecule. The isocyanate equivalent weight of such polyisocyanate compound(s) in some embodiments is 80 to 250, 80 to 200, or 80 to 180. If a mixture of polyisocyanate compounds is present, the mixture may have, for example, an average of 2 to 4 or 2.3 to 3.5 isocyanate groups per molecule.

All or a portion of the polyisocyanate compound having an isocyanate equivalent weight of up to 350 may have aromatic isocyanate groups. Among the useful aromatic polyisocyanate compounds m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4, 6-triisocyanate and 4,4'-dimethyldiphenyl-methane-2,2',5, 5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI", and so-called "liquid MDI" products that are mixtures of MDI and MDI derivatives that have biuret, carbodiimide, uretoneimine and/or allophonate linkages.

All or a portion of the polyisocyanate compound having an isocyanate equivalent weight of up to 350 may be one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

It is preferred that at least some of the polyisocyanate groups present in the polyisocyanate component are aromatic isocyanate groups. If a mixture of aromatic and aliphatic isocyanate groups is present, it is preferred that at least 50% by number, more preferably at least 75% by number, are aromatic isocyanate groups. In some preferred embodiments, the 80 to 95% by number of the isocyanate groups are aromatic, and 5 to 20% by number are aliphatic. It is especially preferred that the isocyanate groups of the prepolymer are aromatic, and the isocyanate groups of the polyisocyanate compound(s) having an isocyanate equivalent weight of up to 350 are a mixture of 80 to 95% aromatic isocyanate groups and 5 to 20% aliphatic isocyanate groups.

It is often convenient to prepare the prepolymer by combining the polyol or polyol mixture with an amount of polyisocyanate compound(s) significantly greater than needed to simply cap the polyol(s). After reaction, this produces a mixture of the prepolymer and unreacted polyisocyanate compounds. If desired, an additional amount of polyisocyanate compound(s) can then be blended into this mixture. In certain embodiments, the polyol(s) are combined and reacted with an excess of one or more aromatic polyisocyanates to produce a mixture of prepolymer and unreacted starting polyisocyanate compounds, and this mixture is combined with one or more aliphatic polyisocyanates.

In an especially preferred embodiment, the prepolymer is made in a reaction of the polyol(s) with MDI, PMDI, a polymeric MDI, derivative of any one or more of these that contains biuret, carbodiimide, uretoneimine and/or allophonate, or a mixture of any two or more of these, to produce a mixture of prepolymer and unreacted starting polyisocyanates, and the mixture is then combined with one or more aliphatic polyisocyanates, especially an aliphatic polyisocyanate based on hexamethylene diisocyanate.

The polyisocyanate component may contain up to 50% by weight of one or more particulate inorganic fillers as described before. In some embodiments, the polyisocyanate component contains at least 20% by weight of one or more such fillers, and may contain, for example, 20 to 50% or 30 to 40% by weight thereof. As before, in some embodiments, the filler excludes carbon particles.

The polyisocyanate component may also contain one or more other additional ingredients, such as those described above with respect to the polyisocyanate compound. As with the polyol component, the polyisocyanate component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction. The polyisocyanate compound preferably contains at most, amounts of plasticizers as described before with respect to the polyol component. The isocyanate component may be devoid of a plasticizer.

The polyol component and polyisocyanate component are formulated such that when equal volumes of the components are provided, the isocyanate index is 1.1 to 1.8. For purposes of this invention, "isocyanate index" is the ratio of the number of isocyanate groups in the polyisocyanate component to the number of isocyanate-reactive groups in the polyol component. For purposes of this calculation, a primary amino group is considered as a single isocyanate-reactive group, even though it has two amine hydrogen atoms. A preferred isocyanate index, at a 1:1 volume ratio, is 1.15 to 1.65.

The invention is also a process for bonding two substrates. In general, the polyol component and the isocyanate component are mixed to form a reaction mixture. The ratio of these materials is generally sufficient to provide an isocyanate index of 1.1 to 1.8, more preferably 1.15 to 165. The reaction mixture is formed into a layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The methods used to mix the isocyanate component with the polyol component, to form the adhesive layer and cure the adhesive are, broadly speaking, not critical and a variety of apparatus can be used to perform these steps. Thus, the isocyanate component and polyol component can be mixed manually, in various types of batch apparatus, and/or using various sorts of automated metering, mixing and dispensing equipment.

The polyol component and isocyanate component often will react spontaneously upon mixing at room temperature (about 22° C.) and cure without the need to heat the adhesive to a greater temperature. Therefore, in some embodiments, curing is effected by simply mixing the components at a temperature of, for example, 0 to 35° C. and allowing the components to react at that temperature.

Heating can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. and then heated to a higher cure temperature. The substrate can be heated before applying the adhesive if desired. If an elevated temperature is used in the curing step, such a temperature may be, for example, 36 to 100° C., or 36 to 65° C.

In some embodiments, the adhesive is formulated to provide a latent cure, i.e., a prolonged "open time" during which the adhesive remains flowable and thus allows for manipulation of the adhesive itself and/or a substrate in contact with the adhesive. In some embodiments, the adhesive exhibits an open time of at least 12 minutes, preferably at least 20 minutes, when mixed and cured at room temperature. A simple test for measuring open time is to apply a bead of adhesive onto a room temperature substrate and then periodically compress the bead with a wooden spatula. The open time is the elapsed time between the time of application and that at which the adhesive no longer sticks to the spatula.

The substrates are not limited. They can be, for example, a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition of the invention. The substrates in other embodiments are individual plies that are glued together using the adhesive of the invention to form a multilayer laminate. The substrates in other embodiments are building members.

ILLUSTRATIVE EMBODIMENTS

The following examples are provided to illustrate the invention, but are not intended to limit the scope thereof. All parts and percentages are by weight unless otherwise indicated. In the following examples:

Polyol A is a nominally trifunctional ethylene oxide-capped poly(propylene oxide) having a molecular weight of about 4800 g/mol and a hydroxyl equivalent weight of about 1600.

PPO-A is a nominally difunctional poly(propylene oxide) having a molecular weight of about 1000 and a hydroxyl equivalent weight of about 500.

PPO-B is a nominally difunctional poly(propylene oxide) having a molecular weight of about 2000 and a hydroxyl equivalent weight of about 1000.

Aminated Polyether A is a 400 g/mol, difunctional poly(propylene oxide) terminated in primary amine groups, sold as Jeffamine™ D-400 by Huntsman Corporation.

Aminated Polyether B is a 230 g/mol, difunctional poly(propylene oxide) terminated in primary amine groups, sold as Jeffamine™ D230 by Huntsman Corporation.

Aminated Polyether C is a 440 g/mol, trifunctional poly(propylene oxide) terminated in primary amine groups, sold as Jeffamine™ T403 by Huntsman Corporation.

Polyisocyanate A is a "liquid MDI" product having an isocyanate functionality of about 2.2 and equivalent weight of about 143.

Polyisocyanate B is a polymeric MDI having an isocyanate functionality of about 2.7 and an isocyanate equivalent weight of about 139.

Polyisocyanate C is a MDI containing mostly the 4,4'-isomer.

Polyisocyanate D is an aliphatic polyisocyanate based on hexamethylene diisocyanate product, having an isocyanate equivalent weight of 193.

Examples 1-2 and Comparative Samples A-E

Polyol Components used in Examples 1-8 and Comparative Samples A-E are made by mixing ingredients as indicated in Table 1. In Table 1, [1]Metatin™ 713 catalyst, from The Dow Chemical Company. [2]Fomrez™ U220 from Chemtura. [3]Dabco™ 33LV from Air Products and Chemicals. [4]Polycat™ SA-1/10 from Air Products and Chemicals. [5]Toyocat™ DB41 from Tosoh Corporation.

TABLE 1

| | Polyol Component Designation | | | | | |
|---|---|---|---|---|---|---|
| | A | B | C | D | E | F |
| | Used in Examples/Comp. Samples: | | | | | |
| Ingredient | A, B | C | D, E | 1-4 | 5, 6 | 7, 8 |
| | Parts by Weight | | | | | |
| Polyol A | 48.14 | 49.74 | 49.74 | 45.34 | 53.51 | 53.51 |
| Aminated Polyether A | 0.6 | 0.6 | 0 | 0.6 | 0 | 0 |
| Aminated Polyether B | 0 | 0 | 0.6 | 0 | 0.6 | 0 |
| Aminated Polyether C | 0 | 0 | 0 | 0 | 0 | 0.6 |
| 1,4-butanediol (equivalents/equivalent Polyol A) | 4.8 (3) | 0 | 0 | 7.6 (5) | 0 | 0 |
| Monoethylene glycol (equivalents/equivalent Polyol A) | 0 | 3.2 (3) | 3.2 (3) | 0 | 5.2 (5) | 4.2 (4) |
| 1,2-propanediol | 0 | 0 | 0 | 0 | 0 | 1 |
| Dibutyltin mercaptide[1] | 0 | 0 | 0 | 0.02 | 0 | 0 |
| Dioctyltin thioglycolate[2] | 0.02 | 0.02 | 0.02 | 0 | 0.05 | 0.05 |
| Triethylene diamine[3] | 0 | 0 | 0 | 0 | 0.07 | 0.07 |
| Blocked DBU A[4] | 0.07 | 0.07 | 0.07 | 0.07 | 0 | 0 |
| Blocked DBU B[5] | 0 | 0 | 0 | 0 | 0.40 | 0.20 |
| Calcined China Clay | 44.38 | 44.38 | 44.38 | 44.38 | 38.13 | 37.33 |
| Hydrophobically Modified Fumed Silica | 1.5 | 1.5 | 1.5 | 1.5 | 1.5 | 1.5 |
| Dispersing Aid | 0.5 | 0.5 | 0.5 | 0.5 | 0.5 | 0.5 |
| Fluorinated Surfactant | 0 | 0 | 0 | 0 | 0.05 | 0.05 |
| Zeolite | 0 | 0 | 0 | 0 | 0 | 1.0 |

Polyisocyanate Components A-H are made from the ingredients listed in Table 2.

TABLE 2

| | Isocyanate Comp Designation | | | | | | | | |
|---|---|---|---|---|---|---|---|---|---|
| | A | B | C | D | E | F | G | H | I |
| | Used in Examples/Comp. Samples: | | | | | | | | |
| Ingredient | A, C, D | B, E | 1 | 2 | 3 | 4 | 5, 7 | 8 | 6 |
| | Parts by Weight | | | | | | | | |
| Polyol A | 17.74 | 17.41 | 20 | 20 | 0 | 0 | 0 | 0 | 20 |
| PPO-A | 0 | 0 | 10 | 10 | 19.2 | 19.2 | 19.2 | 19.2 | 10 |
| PPO-B | 12.09 | 11.86 | 0 | 0 | 0 | 0 | 0 | 0 | 0 |
| Polyisocyanate A | 27.5 | 24.0 | 40 | 36.2 | 37.5 | 41.5 | 10.5 | 37.5 | 36.0 |

TABLE 2-continued

| | Isocyanate Comp Designation | | | | | | | | |
|---|---|---|---|---|---|---|---|---|---|
| | A | B | C | D | E | F | G | H | I |
| | Used in Examples/Comp. Samples: | | | | | | | | |
| Ingredient | A, C, D | B, E | 1 | 2 | 3 | 4 | 5, 7 | 8 | 6 |
| | Parts by Weight | | | | | | | | |
| Polyisocyanate B | 0 | 0 | 0 | 0 | 0 | 0 | 27 | 0 | 0 |
| Polyisocyanate C | 5.08 | 4.99 | 0 | 0 | 0 | 0 | 0 | 0 | 0 |
| Polyisocyanate D | 0 | 5.0 | 0 | 5 | 5 | 0 | 5.5 | 5.0 | 4.0 |
| Calcined China Clay | 0 | 0 | 29.0 | 27.8 | 37.8 | 38.8 | 37.3 | 37.8 | 29.5 |
| Fumed Silica | 0 | 0 | 1.0 | 1.0 | 0.5 | 0.5 | 0.5 | 0.5 | 0.5 |
| Carbon Black | 19 | 19 | 0 | 0 | 0 | 0 | 0 | 0 | 0 |
| Plasticizer | 18.07 | 17.73 | 0 | 0 | 0 | 0 | 0 | 0 | 0 |
| Isocyanate Index | 475 | 475 | 400 | 400 | 400 | 400 | 400 | 400 | 400 |
| % Aromatic isocyanate | 100 | 87 | 100 | 92 | 90 | 100 | 89 | 89 | 90 |
| % Aliphatic isocyanate | 0 | 13 | 0 | 8 | 10 | 0 | 11 | 11 | 10 |

Polyisocyanate Component A is made by combining Polyol A, PPO-B, Polyisocyanate C, and the plasticizer and heating the resulting mixture to a constant isocyanate content, to form a plasticized prepolymer. The plasticized prepolymer is then blended with Polyisocyanate A and the carbon black. Polyisocyanate Component A contains only aromatic isocyanate groups.

Polyisocyanate Component B is made in the same way, except that Polyisocyanate D is also blended into the plasticized prepolymer. Polyisocyanate Component B contains about 13 number-percent aliphatic isocyanate groups and 87 number-percent aromatic isocyanate groups.

Polyisocyanate Components C-I are made by mixing the aromatic polyisocyanates with the polyol(s) and heating the resulting mixture to a constant isocyanate content to form a mixture of prepolymer molecules and unreacted starting polyisocyanates. This mixture has only aromatic isocyanate groups. The mixture in each case is then blended with Polyisocyanate D (if used), the filler and fumed silica to produce the polyisocyanate component.

Examples 1-8 and Comparative Samples A-E are made by mixing the corresponding polyol and polyisocyanate components as indicated in Table 3. In each case, the mixing ratio is 1:1 by volume. The approximate isocyanate index is as indicated in Table 3. Mixing is performed by loading the polyol and polyisocyanate components into separate cartridges and extruding the components from the cartridges using a double cartridge application gun equipped with a static mixing unit.

Open time is measured by extruding a bead of the adhesive onto a polyethylene film, and compressing the bead periodically with a wooden spatula until the adhesive no longer sticks to the wooden surface.

Samples for lap shear strength measurements are prepared by forming a layer of the adhesive between two 100×45×0.8 mm cleaned e-coated steel panels, that overlap to form a bond area of 10×25 mm. The adhesive layer is 1.5 mm thick. The adhesive is applied and the test samples assembled at room temperature. In each case, multiple test specimens are prepared. Lap shear strength is measured according to DIN EN 527 using a Zwick 1435 testing device equipped with a FHM 8606.00.00 or 8606.04.00 mounting device. Measurements are made on separate test specimens after 1, 2, 4 and 24 hours room temperature curing. Results are as indicated in Table 3.

TABLE 3

| Ex. or Comp. Sample | Polyol Comp. | Polyiso-cyanate Comp. | Iso Index | Open Time, Min. | Lap Shear Strength, MPa (Failure Mode) | | | |
|---|---|---|---|---|---|---|---|---|
| | | | | | 1 hr | 2 hr | 4 hr | 24 hr |
| A* | A | A | 138 | 20 | 0.04 (100% CF) | 0.09 (100% CF) | 0.18 (50% CF) | 1.57 (5% CF) |
| B* | A | B | 136 | 46 | 0.03 (100% CF) | 0.06 (100% CF) | 0.13 (100% CF) | 1.41 (50% CF) |
| C* | B | A | 138 | 45 | 0.01/ (100% CF) | 0.03 (100% CF) | 0.11 (100% CF) | 1.67 (10% CF) |
| D* | C | A | 139 | 28 | 0.03 (100% CF) | 0.06 (100% CF) | 0.09 (0% CF) | 0.55 (0% CF) |
| E* | C | B | 141 | 70 | 0 (100% CF) | 0.02 (100% CF) | 0.06 (100% CF) | 0.69 (100% CF) |
| 1 | D | C | 117 | 33 | 0.03 (100% CF) | 0.20 (100% CF) | 0.36 (100% CF) | 2.22 (50% CF) |
| 2 | D | D | | 45 | 0.01 (100% CF) | 0.15 (100% CF) | 0.37 (100% CF) | 3.45 (50% CF) |

TABLE 3-continued

| Ex. or Comp. Sample | Polyol Comp. | Polyiso-cyanate Comp. | Iso Index | Open Time, Min. | Lap Shear Strength, MPa (Failure Mode) | | | |
|---|---|---|---|---|---|---|---|---|
| | | | | | 1 hr | 2 hr | 4 hr | 24 hr |
| 3 | D | E | 127 | 15 | 0.02 (100% CF) | 0.18 (100% CF) | 0.37 (50% CF) | 2.28 (0% CF) |
| 4 | D | F | 129 | 25 | 0.04 (100% CF) | 0.28 (50% CF) | 0.38 (50% CF) | 1.94 (50% CF) |
| 5 | E | G | 136 | 20 | 0.06 (100% CF) | 1.02 (100% CF) | 4.83 (100% CF) | 14.06 (100% CF) |
| 6 | E | I | 115 | 14 | 0.16 (100% CF) | 1.27 (100% CF) | 6.64 (100% CF) | 9.11 (100% CF) |
| 7 | F | G | 141 | 30 | 0.01 (100% CF) | 0.03 (100% CF) | 4.68 (100% CF) | 14.06 (100% CF) |
| 8 | F | H | 152 | 25 | 0.04 (100% CF) | 0.20 (100% CF) | 1.41 (100% CF) | 5.14 (100% CF) |

Comparative Sample A represents a baseline case for this set of experiments. Comparative Sample A is formulated without an ambient cure urethane catalystboth dioctyltin thioglycolate and the blocked DBU catalyst are latent catalysts designed to provide slow if any cure at room temperature. In Comparative Sample A, there are in the polyol component 3 equivalents of 1,4-butanediol per equivalent of Polyol A. This system exhibits an open time of 20 minutes, but as expected due to the lack of ambient temperature catalysts, develops very little shear strength after being cured at room temperature for a day.

Comparative Sample B illustrates the effect of replacing a small portion of the aromatic polyisocyanate with an aliphatic polyisocyanate. The open time is longer, but the shear strength after 24 hours room temperature cure is very poor.

Comparative Samples C and D illustrate the effect of replacing 1,4-butanediol in the Comparative Sample A formulation with monoethylene glycol on an equivalent-for-equivalent basis. This results in a large increase in open time, but shear strength after 24 hours room temperature curing is still poor. The results of Comparative Samples C and D further demonstrate that the change in aminated polyether from Comparative Sample C to D is inconsequential. Including some aliphatic polyisocyanate in this formulation (as in Comparative Sample E) again increases the open time greatly but leads to very poor curing at room temperature. This effect is consistent with that seen by comparing Comparative Sample B with Comparative Sample A.

In Examples 1-4, the amount of 1,4-butanediol in the polyol component is increased to 5 equivalents per equivalent of Polyol A. Importantly, each of these examples is formulated with an ambient cure tin catalyst (dibutyltin mercaptide), together with a latent amine catalyst. Despite the presence of an ambient cure catalyst, open times for Examples 1-4 are all in an acceptable range, and in three of these four cases, even exceeds the open time of the baseline case (Comparative Sample A). Examples 1 and 4 are particularly notable in this respect as they contain no aliphatic polyisocyanate. All of Examples 1-4 develop greater shear strength than any of Comparative Samples A-E after 24 hours room temperature curing, and in addition have developed significantly greater shear strength at the intermediate 2 and 4 hour cure times.

In Examples 5-8, the polyol component contains 4 or 5 equivalents of monoethylene glycol per equivalent of Polyol A. These Examples are formulated with an ambient cure amine catalyst (triethylene diamine) together with a latent tin catalyst. As with Examples 1-4, the open times are all acceptable despite the presence of the ambient cure catalyst, ranging from slightly less then to somewhat longer than that of Comparative Sample A. The shear strength at each of the curing times is several times that of any of the Comparative Samples (and of Examples 1-4). Remarkably, this is despite the presence of an aliphatic polyisocyanate which, as shown in the Comparative Samples, tends to lead to very poor development of shear strength.

Examples 5-8 all fail in cohesive failure mode despite the high shear strengths. This indicates that each of these forms a very strong bond to the substrate, which bond is stronger than the adhesive itself. Comparative Samples A-E exhibit mainly or entirely bond failure, despite the very low shear strengths. This indicates poor adhesion to the substrate.

The foregoing results show that the combination of a high level of 1,4-butanediol and/or monoethylene glycol in the polyol component, together with the presence of a poly (propylene oxide) prepolymer in the isocyanate component, leads to unexpectedly long open times. These open times are achievable even when the composition is formulated with an ambient temperature urethane catalyst, which is a very significant advantage that is believed to contribute to the rapid development in shear strength.

Adhesion of Examples 1-8 is evaluated on surface-roughened and unsurface-roughened CFRP substrate samples, using both room temperature and elevated temperature curing, and using no adhesion promoter. CFRP test panels are cut and assembled with the adhesive as described before. For the surface-roughened CFRP test panels, roughening is done by manually grinding the surfaces using a 320 grinding pad on wet samples until a homogeneous optical appearance is achieved. The ground samples are dried at 80° C. for 8 hours and allowed to cool to room temperature before assembling the test samples. Room temperature curing is performed for 7 days at 23° C./50% relative humidity. Elevated temperature curing is done by first curing at 32° C./50% relative humidity for one hour, then 80° C. for approximately 20 minutes, followed by curing at 23° C./50% relative humidity for 7 days. Results are as indicated in Table 4.

TABLE 4

| Substrate/Curing Condition | Shear Strength, MPa, failure mode | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Surface-roughened, RT cure | 8.2 (100% CF) | 8.1 (100% CF) | 5.4 (50% CF) | 6.8 (50% CF) | 12.4 (100% CF) | 11.4 (100% CF) | 9.2 (100% CF) | 14.3 (100% CF) |
| Surface-roughened, elevated temperature cure | 6.9 (100 CF) | 6.8 (100% CF) | 8.4 (75% CF) | 11.3 (95% CF) | 12.5 (100% CF) | 11.4 (100% CF) | 10.0 (100% CF) | 11.4 (100% CF) |
| No surface roughening, RT cure | 3.6 (5% CF) | 3.3 (0% CF) | 3.2 (50% CF) | 4.1 (50% CF) | 11.4 (100% CF) | 13.3 (100% CF) | 11.3 (100% CF) | 13.3 (100% CF) |
| No surface roughening, elevated temperature cure | 12.7 (90% CF) | 8.5 (95% CF) | 4.7 (50% CF) | 11.3 (90% CF) | 12.8 (100% CF) | 11.5 (11% CF) | 11.1 (100% CF) | 11.5 (100% CF) |

All of Examples 1-8 exhibit excellent adhesion to the ground temperature whether cured at room temperature or at the elevated temperature, although Examples 5-8 are generally superior to Examples 1-4 on the surface-roughened samples. Surprisingly, all adhere very well to the unroughened samples when cured at the elevated temperature. Examples 5-8 generally perform better than Examples 1-4 when applied to the unroughened substrate and cured at room temperature. Examples 5-8 in fact provide very high shear strengths and the desired cohesive failure at all cases.

What is claimed is:

1. A two-component polyurethane adhesive composition having a polyol component and an isocyanate component, wherein:
   the polyol component includes:
   a) at least 35 weight percent, based on the weight of the polyol component, of one or more polyether polyols having a hydroxyl equivalent weight of 400 to 2000 and a nominal hydroxyl functionality of 2 to 4, which polyether polyols(s) are selected from homopolymers of propylene oxide and copolymers of 70 to 99% by weight propylene oxide and 1 to 30% by weight ethylene oxide;
   b) 4 to 8 equivalents per equivalent of a), of one or more aliphatic diol chain extenders;
   c) 0.1 to 3 parts by weight per 100 parts by weight of a), of at least one compound having at least two primary and/or secondary aliphatic amine groups;
   d) i) a catalytically effective amount of at least one ambient temperature urethane catalyst which is active at a temperature of below 30° C., and
      ii) a catalytically effective amount of at least one latent urethane catalyst which is active at a temperature of at least 40° C.;
   e) up to 60 weight percent, based on the weight of the polyol component, of at least one particulate filler;
   and the polyisocyanate component includes:
   25 to 60 weight percent, based on the weight of the polyisocyanate component, of at least one isocyanate-terminated prepolymer having at least 2 isocyanate groups per molecule and an isocyanate equivalent weight of 500 to 3500, the prepolymer being a reaction product of one or more aromatic diisocyanates having a molecular weight of up to 350 with i) at least one 700 to 3000 molecular weight homopolymer of poly(propylene oxide) having a nominal hydroxyl functionality of 2 to 4 or ii) a mixture of i) with up to 3 parts by weight, per part by weight of i), of a 2000 to 8000 molecular weight polyether polyol which is a copolymer of 70 to 99 weight percent propylene oxide and 1 to 30 weight percent ethylene oxide and has a nominal hydroxyl functionality of 2 to 4;
   20 to 50 weight percent, based on the weight of the polyisocyanate component, of at least one polyisocyanate compound having an isocyanate equivalent weight of up to 300 and 2 to 4 isocyanate groups per molecule; and
   up to 50% by weight of at least one particulate filler;
   wherein the isocyanate equivalent weight of the polyisocyanate component and the equivalent weight per isocyanate-reactive group of the polyol component are such that when the polyisocyanate component and the polyol component are mixed at a 1:1 ratio by volume the isocyanate index is 1.1 to 1.8.

2. A composition according to claim 1 wherein the one or more latent room temperature organometallic catalysts contain tin, zinc or bismuth.

3. A composition according to claim 1 wherein the one or more latent room temperature organometallic catalysts are zinc alkanoates, bismuth alkanoates, dialkyltin alkanoates, dialkyl tin mercaptides, dialkyl tin bis(alkylmercaptoacetates), dialkyltin thioglycolates or mixtures thereof.

4. A composition according to claim 1 wherein the one or more latent room temperature organometallic catalysts are dialkyl tin mercaptides, dialkyl tin bis(alkylmercaptoacetates), dialkyltin thioglycolates or mixtures thereof.

5. A composition of claim 1 wherein the latent catalyst is one or both of a dialkyltinthioglycolate and an acid-blocked amidine catalyst.

6. A composition according to claim 5 wherein the acid-blocked amidine catalyst comprises 1,8-Diazabicyclo[5.4.0]undec-7-ene) or 1,5-Diazabicyclo[4.3.0]non-5-ene.

7. A composition of claim 1, wherein the polyol component includes 4 to 7 equivalents of one or more aliphatic diol chain extenders per equivalent of a).

8. A composition of claim 1, wherein the polyol component includes monoethylene glycol.

9. A composition of claim 8, wherein the polyol component includes 4 to 6 equivalents of monoethylene glycol per equivalent of a).

10. A composition of claim 1, wherein the isocyanate-terminated prepolymer is a reaction product of one or more aromatic diisocyanates having a molecular weight of up to 350 with i) at least one 700 to 3000 molecular weight homopolymer of poly(propylene oxide) having a nominal hydroxyl functionality of 2 to 4.

11. A composition of claim 1, wherein the polyol component and the polyisocyanate component each are devoid of a plasticizer.

12. A composition of claim 1, wherein the polyol component and the polyisocyanate component each are devoid of carbon particles.

13. A composition of claim 1, wherein polyisocyanate compound having an isocyanate equivalent weight of up to 300 and 2 to 4 isocyanate groups per molecule is a mixture of at least one aliphatic polyisocyanate compound and at least one aromatic polyisocyanate compound.

14. A cured adhesive formed by curing the two-component polyurethane adhesive composition of claim 1.

15. A method of bonding two substrates, comprising forming a layer of the two-component polyurethane adhesive of claim 1 at a bondline between two substrates, and curing the layer at the bondline to form a cured adhesive bonded to each of the substrates.

16. A composition according to claim 1 wherein d) i) the ambient cure catalyst is selected from stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, dialkyl tin mercaptides; tertiary amines, amidines, bismuth salts, cobalt salts, zinc salts or mixtures thereof and the d) ii) latent urethane catalyst is selected from zinc alkanoates, bismuth alkanoates, dialkyltin alkanoates, dialkyl tin mercaptides, dialkyl tin bis(alkylmercaptoacetates), dialkyltin thioglycolates, acid-blocked tertiary amine and/or cyclic amidine catalysts or mixtures thereof.

17. A composition according to claim 1 wherein the d) ii) latent urethane catalyst is selected from dialkyl tin thioglycolates; and acid-blocked tertiary amine and/or cyclic amidine catalysts.

18. A composition according to claim 1 wherein the d) ii) latent urethane catalyst is selected from dioctyltinthioglcolate, dibutyltinthioglycolate and dimethyltinthioglycolate, acid-blocked tertiary amine and/or cyclic amidine catalysts, in which the acid blocking group is a $C_1$-C18 alkanoic acid, a benzoate or substituted benzoate, or mixtures thereof.

19. A composition according to claim 1 wherein the polyol includes monoethylene glycol, or a mixture of monoethylene glycol with one or both of 1,2-propane diol and 1,4-butanediol, in an amount sufficient to provide at least 4 equivalents of monoethylene glycol per equivalent of polyol a.

* * * * *